United States Patent
Mitomi et al.

(10) Patent No.: US 8,497,335 B2
(45) Date of Patent: Jul. 30, 2013

(54) SURFACE CONDITIONER FOR COATING AGENTS

(75) Inventors: Daisuke Mitomi, Nara (JP); Kazuhiro Miyake, Nara (JP); Masashi Kinugawa, Nara (JP)

(73) Assignee: Kyoeisha Chemical Co., Ltd., Osaka-Shi (JP)

( * ) Notice: Subject to any disclaimer, the term of this patent is extended or adjusted under 35 U.S.C. 154(b) by 0 days.

(21) Appl. No.: 13/387,056

(22) PCT Filed: Jul. 30, 2010

(86) PCT No.: PCT/JP2010/062881
§ 371 (c)(1),
(2), (4) Date: Jan. 25, 2012

(87) PCT Pub. No.: WO2011/013789
PCT Pub. Date: Feb. 3, 2011

(65) Prior Publication Data
US 2012/0123045 A1 May 17, 2012

(30) Foreign Application Priority Data
Jul. 31, 2009 (JP) .................................. 2009-179744

(51) Int. Cl.
*C08F 230/08* (2006.01)
(52) U.S. Cl.
USPC ........... 526/279; 526/305; 526/319; 526/320; 526/328; 526/328.5
(58) Field of Classification Search
None
See application file for complete search history.

(56) References Cited

U.S. PATENT DOCUMENTS

| 5,209,924 | A | * | 5/1993 | Garbe et al. ............... 424/70.11 |
| 5,716,685 | A | * | 2/1998 | Kumar et al. ................ 428/40.1 |
| 6,114,446 | A | | 9/2000 | Narisawa et al. |
| 6,630,522 | B2 | | 10/2003 | Kawase et al. |
| 2004/0022950 | A1 | | 2/2004 | Jung et al. |
| 2004/0062873 | A1 | | 4/2004 | Jung et al. |
| 2007/0025944 | A1 | * | 2/2007 | Feng et al. ................. 424/70.13 |
| 2008/0045623 | A1 | | 2/2008 | Yamaguchi et al. |
| 2011/0152654 | A1 | * | 6/2011 | Wang et al. ................... 600/347 |

FOREIGN PATENT DOCUMENTS

| JP | A-2000-351817 | 12/2000 |
| JP | A-2002-241698 | 8/2002 |
| JP | A-2004-10732 | 1/2004 |
| JP | A-2005-146217 | 6/2005 |
| JP | A-2006-126763 | 5/2006 |
| JP | A-2009-203405 | 9/2009 |
| WO | WO 98/29505 A1 | 7/1998 |
| WO | WO 02/31063 A1 | 4/2002 |
| WO | WO 03/002674 A1 | 1/2003 |
| WO | WO 2009/015493 A1 | 2/2009 |

OTHER PUBLICATIONS

International Search Report issued in International Patent Application No. PCT/JP2010/062881 dated Sep. 21, 2010.
Nov. 20, 2012 Extended European Search Report issued in European Patent Application No. 10804535.2.

* cited by examiner

*Primary Examiner* — Marc Zimmer
(74) *Attorney, Agent, or Firm* — Oliff & Berridge, PLC

(57) ABSTRACT

A surface conditioner for a coating agent is provided. The surface conditioner for the coating agent comprises: a copolymer composed of 1 to 40 parts by weight of an acrylate monomer (A) having a siloxy group, 2 to 80 parts by weight of an N-vinyllactam monomer (B), and 10 to 97 parts by weight of an alkyl(meth)acrylate monomer (C) of which an alkyl group has 1 to 12 carbon atoms; and weight average molecular weight of the copolymer is 1000 to 120000. It is another object of the present invention to provide a coating agent to which said surface conditioner is blended.

12 Claims, No Drawings

SURFACE CONDITIONER FOR COATING AGENTS

TECHNICAL FIELD

The present invention relates to a surface conditioner for a coating agent. When the surface conditioner is blended in a coating agent such as paint and ink in small amounts, it can impart an excellent base material-wetting property and an excellent cissing-preventing property to the coating agent through applying and can also impart an excellent leveling property to a coating layer, to which said coating agent is applied, so that the adhesion of over-coating can be improved. The surface conditioner can also impart an excellent leveling property when it is blended in a baking paint which is cured at high temperature and additionally has heat resistance.

BACKGROUND OF THE INVENTION

Coating treatments using coating agents are performed on various base materials such as metal bodies of automobiles, metal materials for pre-coating, plastic housings for home electric appliances of mobile phones and personal computers, building materials etc in order to improve the appearance and to protect the surface thereof. When such coating agents are used for coating treatments, small amounts of surface conditioners known as smoothing agents such as leveling agents or cissing-preventing agents are pre-blended in the coating agents to prevent the generation of cissing caused by crawling due to the insufficient wetting property of the coating agents and also to prevent the generation of cratering on the surface of the coating layer, so that the coating layer becomes smooth.

As such surface conditioners, silicone-type surface conditioners including polyether-modified polydimethylsiloxanes or polymer-type surface conditioners including polymers formed by polymerization of unsaturated monomers such as (meth)acrylic acid esters and vinyl ethers are used. The coating agent blended with the silicone-type surface conditioner shows an excellent base material-wetting property resulted from its low surface tension which is attributed to the silicone structure thereof, and the surface of a coating layer to which the coating agent is applied shows an excellent leveling property. However, due to the low surface tension, the adhesion of the over-coating is disturbed. Moreover, when baking-finish-coating is performed, the surface conditioner is thermally decomposed due to the insufficient heat resistance attributed to the polyether structure thereof, and thus cissing or protruded humps may be generated by contraries.

On the other hand, the coating agent blended with the polymer-type surface conditioner does not disturb the adhesion of the over-coating and shows the high heat resistance because the surface conditioner has good compatibility in the coating agent attributed to the polymer structure between unsaturated groups. However, the surface tension thereof is not as low as the surface tension attributed to the silicone structure, so the base material-wetting property is insufficient. Also, due to contamination of foreign matters such as dusts or impurities such as oil dusts, the cissing-preventing property is insufficient and causes the generation of the cissing. Therefore, such surface conditioner is required to use accordingly depending on the respect for the purpose or usage of the leveling property, the cissing-preventing property, the heat resistance etc.

As a surface conditioner with an improved leveling property, a cissing-preventing property and a heat resistance, the Japanese Patent Publication 2002-241698 A discloses a smoothing agent for paint and ink which comprises a copolymer of silicone oil having a silicone structure and (meth)acrylic acid ester having a polyether structure. However, a further surface conditioner of general use that decreases the above-mentioned problems while further improving the leveling property, the cissing-preventing property, the heat resistance, the base material-wetting property and the adhesion property of the over-coating are desired.

The present invention is developed to solve the above-mentioned problems. It is an object of the present invention to provide a surface conditioner for a coating agent. The surface agent, which is blended in the coating agent in small amounts, can impart a base material-wetting property and a cissing-preventing property to the coating agent when blended in the coating agent, can impart a leveling property to the coating layer which the coating agent is applied to form a coating layer so as to improve the appearance and smoothness of the surface thereof, can improve an adhesion property of over-coating, can impart an excellent leveling property with heat resistance to the coating agent when blended in a baking paint which is cured at a high temperature. It is another object of the present invention to provide a coating agent to which said surface conditioner is blended.

The surface conditioner for the coating agent of the present invention developed to solve the above-mentioned objects comprises:

a copolymer composed of 1 to 40 parts by weight of an acrylate monomer (A) having a siloxy group, 2 to 80 parts by weight of an N-vinyllactam monomer (8), and 10 to 97 parts by weight of an alkyl(meth)acrylate monomer (C) of which an alkyl group has 1 to 12 carbon atoms;

and weight average molecular weight of the copolymer is 1000 to 120000.

In the surface conditioner for the coating agent, the acrylate monomer (A) having the siloxy group is selected from the group consisting of;

at most 40 parts by weight of a mono(meth)acrylate with (meth)acrylic modification at one terminal, which is represented by the following chemical formula (I)

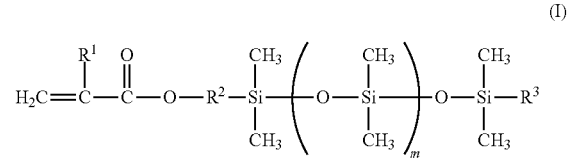

in the chemical formula (I), $R^1$ is a hydrogen atom or a methyl group, $R^2$ is an alkylene group having 1 to 10 carbon atoms, $R^3$ is an alkyl group having 1 to 12 carbon atoms, and m is a positive number of 2 to 150, at most 40 parts by weight of a mono(meth)acrylate with (meth)acrylic modification at one terminal, which is represented by the following chemical formula (II)

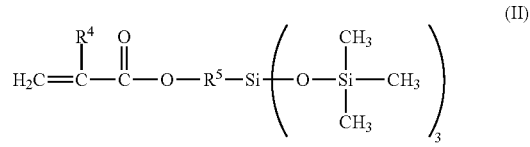

in the chemical formula (II), $R^4$ is a hydrogen atom or a methyl group, $R^5$ is an alkylene group having 1 to 10 carbon atoms, and/or 1 to 10 parts by weight of a di(meth)acrylate with (meth)acrylic modification at both terminals, which is represented by the following chemical formula (III)

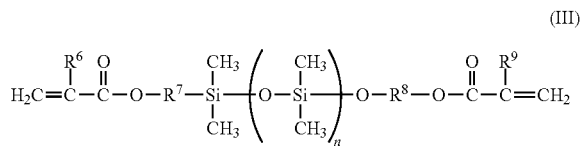

(III)

in the chemical formula (III), $R^6$ and $R^9$ is a hydrogen atom or a methyl group, $R^7$ and $R^8$ are an alkylene group having 1 to 10 carbon atoms, n is a positive number of 2 to 150;
and the N-vinyllactam monomer (B) is N-vinyl-2-pyrolidone and/or N-vinyl-ε-caprolactam.

In the surface conditioner for the coating agent, the copolymer is composed of the acrylate monomer (A) having the siloxy group, the N-vinyllactam monomer (B), the alkyl (meth)acrylate monomer (C), and (meth)acrylate monomer (D) with lactone-modification,
and a ratio by weight of the monomers (A) to (C) and the monomer (D) is 100:1 to 100:90, In the surface conditioner for the coating agent, the copolymer has a property, which a rising temperature beyond 10% of weight reduction of the copolymer is ranging from 280 to 400° C.

A base material-wetting agent of the present invention comprises; the surface conditioner for the coating agent.

A leveling agent of the present invention comprises; the surface conditioner for the coating agent.

A coating agent of the present invention comprises; the surface conditioner for the coating agent, and coating ingredients.

A coating layer of the present invention comprises; the coating agent. And the coating agent is applied and then dried or cured.

The surface conditioner for the coating agent of the present invention has general versatility since it can be blended in an aqueous or non-aqueous coating agent. The surface conditioner for the coating agent can impart a wetting property for a base material to the coating agent when the coating agent blended with the surface conditioner is applied to the base material, and therefore, an excellent leveling property can be given to the surface of the coating layer. The surface conditioner for the coating agent acts as the base material-wetting agent or the leveling agent.

The base material-wetting agent of the present invention prevents generation of cissing caused by pollution of foreign matters such as grits and dusts or contamination of oil dusts when applying the coating agent including the base material-wetting agent, and also prevents generation of pinholes on the surface of the coating layer after applying thereof.

The leveling agent of the present invention can make the surface of the coating layer formed by applying the coating agent including the leveling agent smooth and can make the thickness of the coating layer even while prevents generation of unevenness of the coating, cratering, humps and orange peel with irregularity on the surface of the coating layer. Therefore the leveling agent adjusts the surface to be flat.

The coating agent of the present invention can express an excellent leveling property to the surface of the coating layer formed by applying the agent, even when over-coating is performed on the surface of the coating layer at a room temperature and then heated if necessary, or a baking-finish-coating treatment is performed to the coating layer at 250° C.

The coating layer of the present invention has fine and smooth appearance. Moreover, the coating layer does not cause unevenness of over-coating when the coating layer is finish-coated. The coating layer accomplishes sufficient adhesion to the over-coating layer, and thus they are tightly adhered together. Both coating layer and over-coating layers do not peel off so as to achieve aesthetic appearance and excellent durability.

The coating layer has sufficient heat resistance even when a baking treatment after coating of a coating agent for pre-coating metal is performed at high temperature. Therefore, cissing and humps are not generated on the surface of the coating layer while leveling property is sufficient and the adhesion property of the over-coating is not obstructed.

Hereunder, the embodiments of the present invention will be explained below in detail, but the scope of the present invention is not limited thereto.

The surface conditioner for the coating agent of the present invention comprises the copolymer composed of 1 to 40 parts by weight of the acrylate monomer (A) having the siloxy group, 2 to 80 parts by weight of the N-vinyllactam monomer (B), and 10 to 97 parts by weight of the alkyl(meth)acrylate monomer (C) of which the alkyl group has 1 to 12 carbon atoms.

If the acrylate monomer having the siloxy group (A) is less than 1 part by weight, the base material-wetting property and the cissing-preventing property of the coating agent are not imparted to the coating agent sufficiently. On the other hand, if the acrylate monomer having the siloxy group (A) is more than 40 parts by weight, the compatibility with the ingredients in the coating agent such as resin becomes extremely insufficient. As a result, not only the leveling property becomes insufficient, but also the cissing or cratering is generated on the surface of the coating layer when the coating agent comprising thus acrylate monomer is applied. Moreover, the leveling property of the over-coating deteriorates resu lts the insufficient adhesion property of the over-coating.

If the N-vinyllactam monomer (B) is less than 2 parts by weight, the sufficient leveling property can be obtained but the sufficient base material-wetting property and cissing-preventing property cannot be obtained. On the other hand, if the N-vinyllactam monomer (B) is more than 80 parts by weight, the leveling property becomes insufficient.

If the alkyl(meth)acrylate monomer (C) is less than 10 parts by weight, sufficient leveling property cannot be obtained. On the other hand, if the alkyl(meth)acrylate monomer (C) is more than 97 parts by weight, the base material-wetting property and the cissing-preventing property cannot be obtained.

It is preferable that 2 to 20 parts by weight of the acrylate monomer having the siloxy group (A), 4 to 40 parts by weight of the N-vinyllactam monomer (B) and 20 to 80 parts by weight of the alkyl(meth)acrylate monomer (C) are copolymerized in this range.

The weight-average molecular weight of the copolymer is within the range of 1000 to 120000. If the weight-average molecular weight is less than 1000, the spume of the coating agent is compounded furiously. On the other hand, if the weight-average molecular weight thereof is over 120000, the compatibility thereof with ingredients in the coating agent such as resin deteriorates excessively to get the coating agent cloudy or to generate cratering on the surface of the coating layer to which the coating agent comprising thus copolymer is applied. It is preferable that the weight-average molecular weight of the copolymer is within the range of 2000 to 60000.

The acrylate monomer (A) having the siloxy group is exemplified by the mono(meth)acrylate with (meth)acrylic modification at one terminal represented by the following chemical formulas (I) or (II).

The chemical formula (I) is represented by

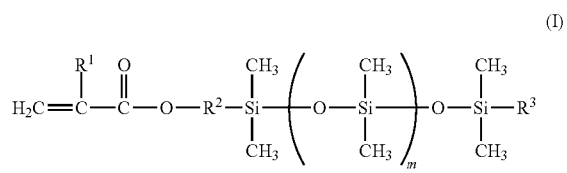

wherein $R^1$ is a hydrogen atom or a methyl group, $R^2$ is an alkylene group having 1 to 10 carbon atoms, and m is a positive number of 2 to 150.

The chemical formula (II) is represented by

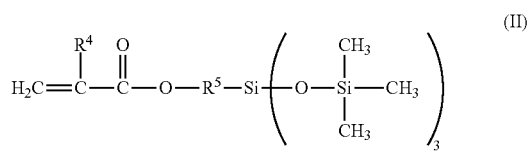

wherein $R^4$ is a hydrogen atom or a methyl group and $R^5$ is an alkylene group having 1 to 10 carbon atoms.

Examples of the acrylate monomer (A) having the siloxy group represented by the chemical formula (I) or (II) are Silaplane FM-0711, Silaplane FM-0721, Silaplane FM-0725, Silaplane TM-0701 and Silaplane TM-0701T which are available from Chisso Corporation ("Silaplane" is a trademark of Chisso Corporation), and X-22-174DX, X-22-2426 and X-22-2475 which are available from Shin-Etsu Chemical Co., Ltd.

The acrylate monomer (A) having the siloxy group constructing the copolymer is preferably used at most 40 parts by weight of at least one of the group consisting of monomers represented by the chemical formulas (I) and (II). However, it can be a monomer represented by at least either chemical formula (I) or (II) and a di(meth)acrylate with (meth)acrylic modification at both terminals represented by the following chemical formula (III)

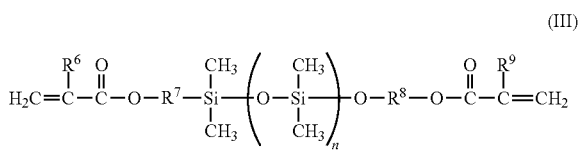

wherein $R^6$ and $R^9$ are the same or different each other, a hydrogen atom or a methyl group, $R^7$ and $R^8$ are the same or different each other, an alkylene group having 1 to 10 carbon atoms, and n is a positive number of 2 to 150.

Examples of the di(meth)acrylate are Silaplane FM-7711, Silaplane FM-7721 and Silaplane FM-7725 which are available from Chisso Corporation, and X-22-164, X-22-164AS, X-22-164A, X-22-164B, X-22-1640 and X-22-164E which are available from Shin-Etsu Chemical Co., Ltd.

1-10 parts by weight of the di(meth)acrylate is preferably copolymerized with the acrylate monomer having the siloxy group represented by the chemical formula (I) or (II). If the di(meth)acrylate is more than 10 parts by weight, geling of the copolymer composed thereof could occur.

The N-vinyllactam monomer (B) is a lactam five- to seven-membered ring having a substituent of an N-vinyl group. More specifically, N-vinyl-2-pyrolidone and N-vinyl-ε-caprolactam can be exemplified. These can be used alone or combined.

The alkyl(meth)acrylate monomer (C) means an alkyl acryate or an alkyl methacrylate. Concretely, examples of the alkyl (meth)acrylate monomer (C) are methyl(meth)acrylate, ethyl(meth)acrylate, normal-propyl(meth)acrylate, isopropyl (meth)acrylate, normal-butyl(meth)acrylate, isobutyl(meth) acrylate, tertiary-butyl(meth)acrylate, normal-octyl(meth) acrylate, 2-ethylhexyl(meth)acrylate, isononyl(meth) acrylate, isodecyl(meth)acrylate and dodecyl(meth)acrylate.

The copolymer may be copolymerized from the acrylate monomer (A) having the siloxy group, the N-vinyllactam monomer (B), the alkyl(meth)acrylate monomer (C) and the (meth)acrylate monomer (D) with lactone-modification, of which a ratio by weight of the monomers (A)-(C) and the monomer (D) is 100:10-90. It is preferable that the ratio is 100:5-70.

The copolymer may be copolymerized from the acrylate monomer having the siloxy group (A), the N-vinyllactam monomer (B), the alkyl(meth)acrylate monomer (C), the lactone-modified (meth)acrylate monomer (D) and, besides these, a diluent monomer (E) which can be copolymerized. The diluent monomer (E) is not limited to any species, and it can be copolymerized as long as it does not disturb the surface conditioning effect of the surface conditioner for the coating agent. Specific rate of the diluent monomer (E) by weight is within the range of 40% to the total amount of the acrylate monomer having the siloxy group (A), the N-vinyllactam monomer (B) and the alkyl(meth)acrylate monomer (C).

Examples of the lactone-modified (meth)acrylate monomer (D) are reaction products of an acrylic-type monomer containing a hydroxyl group and a lactone-group compound represented by β-propiolactone, dimethylpropiolactone, butyllactone, γ-valerolactone, γ-caprylolactone, γ-laurylolactone, ε-caprolactone or δ-caprolactone. Concretely, examples of such lactone-modified (meth)acrylate monomer (D) are PLACCEL FM5 (trade name; caprolactone-modified methacrylate hydroxyl esters), PLACCEL FM2D, PLACCEL FM3, PLACCEL F1 DDM, PLACCEL FA2D, PLACCEL FA10L etc., which are available from Daicel Chemical industries, Ltd.

Examples of the diluent monomer (E) are a (meth)acrylic acid monomer such as acrylic acid and methacrylic acid; a (meth)acrylate monomer such as 2-hydroxyethyl(meth)acrylate, stearyl(meth)acrylate and benzyl(meth)acrylate; a (meth)acrylamide monomer such as (meth)acrylamide; an aromatic vinyl monomer such as styrene and vinyl toluene; a straight- or cyclic-alkyl vinyl ether monomer having the alkyl of 1 to 12 carbon atoms such as normal-butyl vinyl ether, isobutyl vinyl ether, dodecyl vinyl ether and cyclohexyl vinyl ether; a vinyl ester monomer such as vinyl acetate, vinyl propionate and vinyl laurate.

Although the heat resistance of the copolymer is depended on the species of the monomer, so as long as each monomers within the range of the ratio by weight, the copolymer has the heat resistance.

The surface conditioner for the coating agent may consist of the copolymer only, or may comprise the copolymer dissolved or suspended in an inactive solvent for the preparation thereof.

It is preferable that the inactive solvent can dissolve or suspend the copolymer and can be admixed in the surface conditioner for the coating agent. Specifically, examples of the inactive solvent are a hydrocarbon-type solvent such as xylene, toluene and cyclohexane; a ketone-type solvent such as cyclohexanone and methyl isobutyl ketone; an ether-type solvent such as methyl cellosolve, cellosolve, butyl cellosolve, methyl carbitol, carbitol, butyl carbitol, diethyl carbitol and propylene glycol monomethyl ether; an ester-type solvent such as normal-butyl acetate, isobutyl acetate, normal-amyl acetate, cellosolve acetate, propylene glycol monomethyl ether acetate and 3-methoxybutyl acetate, an alcohol-type solvent such as normal-butyl alcohol, sec-butyl alcohol, isobutyl alcohol, cyclohexanol, 2-ethylhexanol and 3-methyl-3-methoxybutanol. These solvents may be used alone or mixed plurally.

The surface conditioner for the coating agent is prepared as follows. The acrylate monomer having the siloxy group (A), the N-vinyllactam monomer (B), the alkyl(meth)acrylate monomer (C), and if necessary the lactone-modified (meth) acrylate monomer (D) and if necessary the diluent monomer (E) are copolymerized through a random copolymerization if necessary in the solvent, under presence of a radical polymerization initiator and if necessary a chain transfer agent, to prepare the surface conditioner for the coating agent.

The surface conditioner for the coating agent may be obtained by mixing the inactive solvent and the copolymer after synthesizing the copolymer.

The method for the copolymerization of the copolymer may be cationic copolymerization or anionic copolymerization.

The copolymer may be a block copolymer or a graft copolymer.

The surface conditioner for the coating agent may be used as a base material wetting agent, a cissing-preventing agent or a leveling agent, while it may be blended in either aqueous coating agent or non-aqueous coating agent. The coating agent blended with the surface conditioner for the coating agent develops excellent base material-wetting property, cissing-preventing property and leveling property, and may further have defoaming property.

When it is used as the base material-wetting agent, the coating agent is able to apply onto the base material with a poor wetting property such as plastics without repelling thereof. It is used for the cissing-preventing agent as well as the base material-wetting agent.

The surface conditioner for the coating agent can be blended in a coating agent for high temperature baking such as a coating agent for pre-coating of metal substrate. The copolymer in the surface conditioner for the coating agent in this case has the following thermal property from the aspect of fundamental heat resistance of the copolymer preferably. As regards to the thermal property, a rising temperature, which the reduced quantity of the heated copolymer through heating from the original copolymer is 10% by weight, is preferably ranging from 280 to 400° C. Hereunder, thus specific rising temperature is termed as "the rising temperature at 10 weight % reduction".

The rising temperature at 10 weight % reduction is obtained by thermo-gravimetric analysis (TG). The rising temperature at 10 weight % reduction is identified by the temperature when weight of a sample of the copolymer is reduced during heat up beyond 10% through decomposition or sublimation thereof.

If the rising temperature at 10 weight % reduction of the copolymer is less than 280° C., the coating agent for high temperature baking blended with the copolymer such as the coating agent for pre-coating of the metal substrate deteriorates the adhesion property of the over-coating and the base material-wetting property distinctly because, when thus coating agent for high temperature baking is applied onto the material to bake at approximately 250° C., the copolymer decomposes by the heat and then the cissing or humps are generated at the surface of the coating layer due to the decomposing material thereof.

If the rising temperature at 10 weight % reduction of the copolymer is more than 400° C., the compatibility of the copolymer with other ingredients such as the resins in the coating agent deteriorates, so that the coating agent tends to get cloudy or generate dissociation of the copolymer and other ingredient.

The coating agent of the present invention is prepared by pre-mixing the coating ingredients, blending with the surface conditioner for the coating agent, and then kneading thereof. They may be mixed all together, or in arbitrary order.

In the acceptable embodiment, 0.01-20% by weight, preferably 0.1-1.0% by weight as a converted solid content concentration of the surface conditioner for the coating agent may be blended in the coating agent.

The coating ingredients blended in the coating agent are not limited. Examples of the coating ingredients are colorant such as a pigment and a dye; a resin; a diluent solvent; a catalyst; and a surface-active agent. Also, if necessary, a sensitizer, an antistatic agent, a defoaming agent, a dispersant or a viscosity modifier may be blended in the coating agent.

Examples of the resin are an acrylic resin, a polyester resin, an urethane resin, an alkyd resin, an epoxy resin, an amino resin etc. In particular, those resins may be heat-cured-type-, ultraviolet-cured-type-, electron-cured-type-, oxidation-cured-type-, cationic poto-cured-type-, peroxide-cured-type-, and acid/epoxy-cured-type-resins. Thus resins may be prepared by curing under presence or absence of a catalyst with a chemical reaction. Thus resins also may be a resin having high glass-transition point, which simply forms the coating layer by volatilization of the solvent without any chemical reaction.

The diluent solvent is not limited as long as it is an organic solvent of general use. Examples thereof are a hydrocarbon-type solvent such as xylene, toluene and cyclohexane; a ketone-type solvent such as cyclohexanone and methyl isobutyl ketone; an ether-type solvent such as methyl cellosolve, cellosolve, butyl cellosolve, methyl carbitol, carbitol, butyl carbitol, diethyl carbitol and propylene glycol monomethyl ether; an ester-type solvent such as normal-butyl acetate, isobutyl acetate, normal-amyl acetate, cellosolve acetate, propylene glycol monomethyl ether acetate and 3-methoxybutyl acetate; an alcohol solvent such as normal-butyl alcohol, sec-butyl alcohol, isobutyl alcohol, cyclohexanol, 2-ethylhexanol and 3-methyl-3-methoxybutanol. These solvents may be used alone, mixed plurally, if necessary with further water.

The coating layer of the present invention is prepared by applying the coating agent onto the base material, and then forming the coating from the coating portions by drying or curing at the surface thereof.

Although the base material is not limited, examples of raw material thereof, which forms the base material, are plastics, rubber, paper, wood, glass, metal, stone, cement, mortar and ceramics. Examples of the base material are used for exterior materials of home electric appliances or automobiles, commodities, and architectural materials.

Examples of the coating method of the coating agents are a spin coating method, a slit coating method, a spray coating method, a dip coating method, a bar coating method, a doctor blade method, a roll coating method and a flow coating method.

Preparation Examples 1 to 5 show embodiments of preparing surface conditioners for a coating agent of the present invention, and Comparative Preparation Examples 1 to 5 show embodiments of preparing surface conditioners which are outside of the scope of the present invention.

PREPARATION EXAMPLE 1

160 parts by weight of xylene was added into 1000 ml. of a reaction vessel equipped with a stirrer, a reflux condenser, a dropping funnel, a thermometer and a bubbling spout of nitrogen gas, and then it was heated until 110° C. under nitrogen gas atmosphere. The temperature of xylene was kept at 110° C., and a solution (a-1) for dropping shown in below Table 1 was added dropwise using the dropping funnel for 3 hours at the constant dropping speed, to prepare a monomer solution. After dropping, the obtained monomer solution was heated until 120° C., and then was reacted for 2 hours to synthesize a copolymer. Thereafter it was diluted by xylene till concentration of residue thereof was 50% by weight to prepare a surface conditioner for a coating agent. The copolymer in the surface conditioner was measured by gel permeation chromatography which molecules having different molecular weight were isolated. The copolymer in the surface conditioner for the coating agent was eluted with respect to each molecular weight thereby, and molecular weight distribution was determined. A calibration curve was ready drawn up from standard materials of polystyrene which certifies molecular weight respectively. The molecular weight distribution of the copolymer in the surface conditioner was compared with the calibration curve to obtain the weight-average molecular weight of the copolymer. In the result, the weight-average molecular weight of the copolymer in the surface conditioner was 8000 as a conversion value to the polystyrene.

PREPARATION EXAMPLE 2

A surface conditioner for a coating agent was obtained as similar as Preparation Example 1 except for using a solution (a-2) for dropping at 95° C. of dropping temperature instead of the solution for dropping of Preparation Example 1. The weight-average molecular weight of the copolymer in the surface conditioner for the coating agent, which was determined by the gel permeation chromatography, was 15000 as a conversion value to polystyrene.

PREPARATION EXAMPLE 3

A surface conditioner for a coating agent was obtained as similar as Preparation Example 1 except for using a solution (a-3) for dropping at 120° C. of dropping temperature instead of the solution for dropping of Preparation Example 1. The weight-average molecular weight of the copolymer in the surface conditioner for the coating agent, which was determined by the gel permeation chromatography, was 5000 as a conversion value to polystyrene.

PREPARATION EXAMPLE 4

A surface conditioner for a coating agent was obtained as similar as Preparation Example 1 except for using a solution (a-4) for dropping at 120° C. of dropping temperature instead of the solution for dropping of Preparation Example 1. The weight-average molecular weight of the copolymer in the surface conditioner for the coating agent, which was determined by the gel permeation chromatography, was 5000 as a conversion value to polystyrene.

PREPARATION EXAMPLE 5

A surface conditioner for a coating agent was obtained as similar as Preparation Example 1 except for using a solution (a-5) for dropping at 105° C. of dropping temperature instead of the solution for dropping of Preparation Example 1. The weight-average molecular weight of the copolymer in the surface conditioner for the coating agent, which was determined by the gel permeation chromatography, was 4000 as a conversion value to polystyrene.

COMPARATIVE PREPARATION EXAMPLE 1

A surface conditioner for a coating agent was obtained as similar as Preparation Example 1 except for using a solution (b-1) for dropping instead of the solution for dropping of Preparation Example 1. The weight-average molecular weight of the copolymer in the surface conditioner for the coating agent, which was determined by the gel permeation chromatography, was 8000 as a conversion value to polystyrene.

COMPARATIVE PREPARATION EXAMPLE 2

A surface conditioner for a coating agent was obtained as similar as Preparation Example 1 except for using a solution (b-2) for dropping instead of the solution for dropping of Preparation Example 1. Incidentally additive molar value of ethylene oxide to 1 molar of methacrylic acid methoxy polyethylene glycol ester as the ingredient in the solution for dropping is 4. The weight-average molecular weight of the copolymer in the surface conditioner for the coating agent, which was determined by the gel permeation chromatography, was 7000 as a conversion value to polystyrene.

COMPARATIVE PREPARATION EXAMPLE 3

A polymer-type leveling agent: POLYFLOW No. 77, which consists of 100% of effective ingredient as main constituent of acrylic polymer and is available from Kyoeisha Chemical Co., LTD., was used for a surface conditioner for a coating agent.

COMPARATIVE PREPARATION EXAMPLE 4

A silicone-type leveling agent: GRANOL 400, which consists of 100% of effective ingredient as main constituent of modified silicone and is available from Kyoeisha Chemical Co., LTD., was used for a surface conditioner for a coating agent.

COMPARATIVE PREPARATION EXAMPLE 5

A polymer-type leveling agent: POLYFLOW No. 50E, which consists of 50% of effective ingredient as main constituent of acrylic polymer and is available from Kyoeisha Chemical Co., LTD., was used for a surface conditioner for a coating agent.

Table 1 shows that blended amounts of each ingredient in the solutions for dropping of Preparation Examples 1-5 and Comparative Preparation Examples 1-5 respectively.

TABLE 1

|  |  | Preparation Example | | | | | Comparative Preparation Example | |
| --- | --- | --- | --- | --- | --- | --- | --- | --- |
|  |  | 1 | 2 | 3 | 4 | 5 | 1 | 2 |
|  | Solution for Dropping | a-1 | a-2 | a-3 | a-4 | a-5 | b-1 | b-2 |
| Monomer (A) | SILAPLANE FM-0711 | 20 |  | 20 |  | 20 | 20 | 20 |
|  | SILAPLANE TM-0701T |  | 30 |  | 30 |  |  |  |
| Monomer (B) | N-vinyl-2-pyrolidone | 30 | 50 | 50 |  | 30 |  |  |
|  | N-vinyl-ε-caprolactam |  |  |  | 70 |  |  |  |
| Monomer (C) | Butyl Acrylate | 220 |  | 140 | 100 | 170 | 230 | 80 |
|  | Isobutyl Acrylate |  | 100 |  |  |  |  |  |
|  | 2-Ethylhexyl Acrylate |  | 100 |  | 80 |  |  |  |
|  | Lauryl Methacrylate |  |  | 60 |  |  |  |  |
| Monomer (D) | PLACCEL FM3 |  |  |  |  | 50 |  |  |
| Monomer (E) except for (A)(B)(C)(D) | Methacrylic Acid Methoxy Polyethylene Glycol Ester |  |  |  |  |  |  | 150 |
| Polymerization Initiator | tert-Butylperoxy-2-ethyl Hexanoate | 10 | 10 | 10 | 10 | 10 | 10 | 10 |
| Inactive Solvent | n-Butyl Acetate | 100 | 100 | 100 | 100 | 100 | 100 | 100 |

Unit of each Numerical Values: Parts by Weight (Thermo-gravimetric Analysis)

The copolymers of Preparation Examples 1-5 and Comparative Preparation Examples 1-5 are measured by thermo-gravimetric analysis as follows. Above-mentioned surface conditioners for the coating agent were dried for 3 hours at 105° C. 10 mg of them were precisely weighted respectively, and then each of them was heated up from room temperature under nitrogen atmosphere on 10° C. per minute of rate of temperature increase to determine the rising temperature at 10 weight % reduction.

The results were summarized in Table 2. As shown in Table 2, the every results of the rising temperature at 10 weight % reduction of Preparation Examples 1-5 were 280° C. or above. Consequently, when the surface conditioner for the coating agent of the present invention is blended in the coating agent for high temperature baking such as the coating agent for pre-coating of the metal substrate, the copolymer in the surface conditioner for the coating agent does not decompose through baking the surface of the coating layer thereby at 250° C. On the other hand, the coating layers of Comparative Preparation Examples 2 and 4 indicate the comparatively-lower rising temperature at 10 weight % reduction and inferior heat resistance than ones of Preparation Examples 1-5. The rising temperature at 10 weight % reduction of Comparative reparation Example 2 decreases due to an ether bond of the methacrylic acid methoxy polyethylene glycol ester.

TABLE 2

| Polymer | Rising Temperature at 10 weight % Reduction (° C.) |
| --- | --- |
| Preparation Example 1 | 285 |
| Preparation Example 2 | 283 |
| Preparation Example 3 | 290 |
| Preparation Example 4 | 283 |
| Preparation Example 5 | 280 |

TABLE 2-continued

| Polymer | Rising Temperature at 10 weight % Reduction (° C.) |
| --- | --- |
| Comparative Preparation Example 1 | 289 |
| Comparative Preparation Example 2 | 198 |
| Comparative Preparation Example 3 | 285 |
| Comparative Preparation Example 4 | 193 |
| Comparative Preparation Example 5 | 282 |

Next, embodiments of coating agents and coating layers, which apply the present invention and were prepared by using the surface conditioners for the coating agent of Preparation Examples 1-15, are explained in Examples 1-5 respectively. Embodiments of coating agents and coating layers, which do not apply the present invention and were prepared by using the surface conditioners of Comparative Preparation Examples 1-5, are explained in Comparative Examples 1-12 respectively.

EXAMPLE 1

100 parts by weight of urethane acrylate: UA-306I which is available from Kyoeisha Chemical Co., LTD. and is trade name, 40 parts by weight of methyl ethyl ketone, 3 parts by weight of a photopolymerization initiator: IRGACURE 184 which is available from Ciba Japan K.K. and whose IRGACURE is the registered trade name of the Corporation, and 0.8 parts by weight of the surface conditioner for the coating agent of Preparative Example 1 were kneaded by using a laboratory disperser at 1000 r.p.m. for 2 minutes to prepare an ultraviolet curable coating agent. The coating agent was applied onto base materials of a glass plate and a cation electrodeposition coating plate which is available from Nippon Testpanel Co., Ltd. And then the plates were dried at 70°

C. for 2 minutes. They were irradiated with 600 mJ/cm² of active energy by using an active energy irradiating equipment having 80 W high-pressure mercury vapor lamp at 10 cm of distance towards the base materials to prepare cured coating layers respectively.

EXAMPLES 2-4, 13, AND COMPARATIVE EXAMPLES 1-4

Ultraviolet curable coating agents and coating layers of Examples 2-4, 13, and Comparative Examples 3-4 were obtained as similar as Example 1 except for using surface conditioners of Preparation Examples 2-5, and Comparative Preparation Examples 1-4 and using 0.4 parts by weight of thus surface conditioners in case of Comparative Preparation Examples 3 and 4 instead of the surface conditioner for the coating agent of Preparation Examples 1.

The physical and chemical assays of the ultraviolet curable coating agents and the coating layers of Examples 1-4, 13, and Comparative Examples 1-4 were performed. The physical and chemical assays are the following compatibility assay, cissing-preventing assay, leveling assay, adhesion assay of the over-coating.

(Compatibility Assay)

The compatibility assay was performed according to the following procedure. The transparency of the ultraviolet curable coating agents obtained in Examples 1-4, 13, and Comparative Examples 1-4 was observed visually, and then the compatibility of the copolymer in the coating agents was evaluated in accordance upon the transparency. The results of evaluation thereof were classified by two grades according to definition that the observance of transparency was "sufficient" and the observance of cloud was "poor".

(Cissing-preventing Assay)

The cissing-preventing assay was performed according to the following procedure. A commercially available hand cream was thinly put on a finger, and then surface of a glass plate was touched by the finger to leave behind fingerprint. The ultraviolet curable coating agents obtained in Examples 1-4, 13, and Comparative Examples 1-4 were respectively applied onto the surface of the glass by using an applicator of a coater for 100 microns, and then they were cured by the procedures as Example 1 to prepare coating layers. The put fingerprint portion was visually observed to evaluate the cissing-preventing property. The results of evaluation thereof were classified by three grades according to definition that the observance of no cissing and smoothness was "sufficient", the observance of no cissing and visible fingerprint was "rather poor", and the observance of significantly marked cissing was "poor".

(Leveling Assay)

The leveling assay was performed according to the following procedure. The ultraviolet curable coating agents obtained in Examples 1-4, 13, and Comparative Examples 1-4 were respectively applied onto the surface of glass plates by using an applicator of a coater for 100 microns, and then they were cured by the procedures as Example 1 to prepare coating layers. The surface was visually observed to evaluate the leveling property. The results of evaluation thereof were classified by three grades according to definition that the observance of no cratering or no cissing and smoothness was "sufficient", the observance of orange-peel like surface as citrus-peel like surface and rough smoothness was "rather poor", and the observance of significantly marked orange-peel like surface and extremely deteriorated gloss or smoothness was "poor".

(Adhesion Assay of the Over-coating)

The ultraviolet curable coating agents obtained in Examples 1-4, 13, and Comparative Examples 1-4 were respectively applied onto a cation electrodeposition coating plates by using No. 22 bar-coater, and then they were cured by the procedures mentioned in Example 1 to prepare coating layers. Other ultraviolet curable coating agents were respectively prepared by consisting of 100 parts by weight of UA-306I, 40 parts by weight of methyl ethyl ketone, 1.5 parts by weight of carbon black: FW200 which is available from Evonik Degussa Japan Co., Ltd., 1.5 parts by weight of dispersant for pigment: FLOWLEN DOPA-17 which is available from Kyoeisha Chemical Co., LTD. and is trade name, 3 parts by weight of IRGACURE 184, without addition of a surface conditioner. The ultraviolet curable coating agents were respectively applied onto the above-mentioned coating layers, and then they were cured by the procedures as similar as Example 1 to prepare over-coating layers. The adhesion assay of the over-coating was evaluated by a cross-cut test according to Japanese Industrial Standard K-5600-5-6, as follows. Incisions of perpendicular grid pattern were cut in the over-coating layers. After a transparent pressure-sensitive adhesive tape was attached over the incisions and then stripped off, number of grid bit fallen off was visually observed to evaluate. The results of evaluation thereof were classified by one hundred grades according to definition as the surviving rate of the grid bits which were not fallen off. More specially, "0" means that all grid bits were fallen off, and "100" means that no grid bit was fallen off.

The results were summarized in Table 3. As shown in Table 3, it is obvious that the coating agents obtained in Examples 1-4, 13 had the excellent cissing-preventing property and compatibility property. It is also previous the surface of the coating layers applied with thus ultraviolet curable coating agents had the excellent leveling property and adhesion property of the over-coating. On the other hand, it is obvious that the coating agents obtained in Comparative Examples 1-4 had at least one of insufficient properties of them than ones of the coating agents obtained in Examples 1-4, 13.

TABLE 3

| | Surface Conditioner | Compatibility | Cissing-Preventing Property | Leveling Property | Adhesion of Over-coating |
|---|---|---|---|---|---|
| Example 1 | Preparation Example 1 | Sufficient | Sufficient | Sufficient | 100 |
| Example 2 | Preparation Example 2 | Sufficient | Sufficient | Sufficient | 100 |
| Example 3 | Preparation Example 3 | Sufficient | Sufficient | Sufficient | 100 |
| Example 4 | Preparation Example 4 | Sufficient | Sufficient | Sufficient | 100 |
| Example 13 | Preparation Example 5 | Sufficient | Sufficient | Sufficient | 100 |
| Comparative Example 1 | Comparative Preparation Example 1 | Poor | Rather Poor | Rather Poor | 20 |
| Comparative Example 2 | Comparative Preparation Example 2 | Sufficient | Sufficient | Rather Poor | 80 |
| Comparative Example 3 | Comparative Preparation Example 3 | Sufficient | Rather Poor | Sufficient | 100 |
| Comparative Example 4 | Comparative Preparation Example 4 | Poor | Sufficient | Rather Poor | 0 |

EXAMPLE 5

40 parts by weight of acrylic resin: ACRYDIC A801 which is available from DIC Corporation and whose ACRYDIC is registered trade name of DIC Corporation, 10 parts by weight of polyisocyanate: SUMIDUR N-75 which is available from Sumitomo Chemical Co., LTD. and whose SUMIDUR is registered trade name of Sumitomo Chemical Co., LTD., 50 parts by weight of thinner which is blended of xylene and butyl acetate with ratio of 4:1 by volume, and 0.6 parts by weight of the surface conditioner for the coating agent of Preparative Example 1 were kneaded by using a laboratory disperser at 1000 r.p.m. for 2 minutes to prepare a dual acrylic urethane coating agent. The coating agent was respectively applied onto base materials of an aluminum plate and a cation electrodeposition coating plate by using an air spray having 1.0 mm of a bore for discharge and 3.5 kg/cm² of discharge pressure under conditions of 25° C. of temperature and 70% of humidity. And then the plates were dried at 80° C. for 3 hours to prepare cured coating layers respectively.

EXAMPLES 6-8, 14 AND COMPARATIVE EXAMPLES 5-8

Dual acrylic urethane coating agents and coating layers thereby of Examples 6-8, 14, and Comparative Examples 5-8 were obtained as similar as Example 5 except for using the surface conditioners of Preparation Examples 2-5, and Comparative Preparation Examples 1-2, and 4-5 and using 0.3 parts by weight of thus surface conditioners in case of Comparative Preparation Example 4 instead of the surface conditioner for the coating agent of Preparation Example 5.

The physical and chemical assays of the dual acrylic urethane coating agents and coating layers thereby of Examples 5-8, 14, and Comparative Examples 5-8 were performed. The physical and chemical assays are the compatibility assay, cissing-preventing assay, leveling assay, and adhesion assay of the over-coating.
(Compatibility Assay)
The compatibility assay was performed as same as mentioned above to evaluate.
(Cissing-preventing Assay)
The cissing-preventing assay was performed to evaluate as similar as the assay mentioned above except for the procedure in Example 5 using the aluminum plate as the base plate instead of the procedure using the glass plate as the base plate by the applicator of the coater for 100 microns.
(Leveling Assay)
The leveling assay was performed to evaluate as similar as the assay mentioned above except for the procedure in Example 5 using the aluminum plate as the base plate instead of the procedure using the glass plate as the base plate by the applicator of the coater for 100 microns.
(Adhesion Assay of the Over-coating)
The dual acrylic urethane coating agents and coating layers thereby obtained in Examples 5-8, 14 and Comparative Examples 5-8 were respectively applied onto cation electrodeposition coating plates and cured to prepare coating layers as similar as the procedure mentioned in Example 5. Other dual acrylic urethane coating agents were respectively prepared by consisting of 40 parts by weight of acrylic resin: ACRYDIC A801, 10 parts by weight of SUMIDUR N-75, 50 parts by weight of thinner which is blended of 4:1 by volume, 1.5 parts by weight of carbon black: FW200, and 1.5 parts by weight of FLOWLEN DOPA-17, without addition of a surface conditioner. The dual acrylic urethane coating agents were respectively applied onto the above-mentioned coating layers, and then they were cured by the procedures as similar as Example 5 to prepare over-coating layers. The assay and criteria of the evaluations are as same as mentioned above.

The results were summarized in Table 4, As shown in Table 4, it is obvious that the coating agents and the surface of the coating layer thereby obtained in Examples 5-8, 14 had all excellent properties of each assays, although it is obvious that the coating agents obtained in Comparative Examples 5-8 had at least one of insufficient properties of them than ones of the coating agents obtained in Examples 5-8, 14.

TABLE 4

|  | Surface Conditioner | Compatibility | Cissing-Preventing Property | Leveling Property | Adhesion of Over-coating |
|---|---|---|---|---|---|
| Example 5 | Preparation Example 1 | Sufficient | Sufficient | Sufficient | 100 |
| Example 6 | Preparation Example 2 | Sufficient | Sufficient | Sufficient | 100 |
| Example 7 | Preparation Example 3 | Sufficient | Sufficient | Sufficient | 100 |
| Example 8 | Preparation Example 4 | Sufficient | Sufficient | Sufficient | 100 |
| Example 14 | Preparation Example 5 | Sufficient | Sufficient | Sufficient | 100 |
| Comparative Example 5 | Comparative Preparation Example 1 | Poor | Rather Poor | Rather Poor | 40 |
| Comparative Example 6 | Comparative Preparation Example 2 | Sufficient | Sufficient | Rather Poor | 90 |
| Comparative Example 7 | Comparative Preparation Example 4 | Sufficient | Sufficient | Rather Poor | 20 |
| Comparative Example 8 | Comparative Preparation Example 5 | Sufficient | Rather Poor | Rather Poor | 100 |

EXAMPLE 9

44 parts by weight of polyester: ALMATEX P646 which is available from Mitsui Chemicals, Inc. and whose ALMATEX is registered trade name of Mitsui Chemicals, Inc., 11 parts by weight of melamine resin: U-VAN 20SE60 which is available from Mitsui Chemicals, Inc. and whose U-VAN is registered trade name of Mitsui Chemicals, Inc., 28 parts by weight of titanium oxide: CR-95 which is available from Ishihara Sangyo KAISHA, LTD. and is trade name, 17 parts by weight of thinner which is blended of SOLVESSO 100 which is available from Exxon Mobil Corporation and is trade name and methyl isobutyl ketone with ratio of 9:1 by volume, and 0.6 parts by weight of the surface conditioner for the coating agent of Preparative Example 1 were kneaded by using a laboratory disperser at 1000 r.p.m. for 2 minutes to prepare a coating agent of polyester melamine for baking. The coating agent was respectively applied onto base materials of a tin plate and a cation electrodeposition coating plate by No. 22 bar-coater, and then they were dried at 260° C. for 50 seconds to prepare cured coating layers.

EXAMPLES 10-12, 15 AND COMPARATIVE EXAMPLES 9-12

The coating agents of polyester melamine for baking of Examples 10-12, 15, and Comparative Examples 9-12 were obtained as similar as Example 9 except for using surface conditioners of Preparation Examples 2-5, and Comparative Preparation Examples 1-2, and 4-5 and using 0.3 parts by weight of thus surface conditioners in case of Comparative Preparation Example 4 instead of the surface conditioner for the coating agent of Preparation Example 9.

The physical and chemical assays of the coating agents of polyester melamine for baking of Examples 10-12, 15, and Comparative Examples 9-12 were performed. The physical and chemical assays are the compatibility assay, cissing-preventing assay, and leveling assay, adhesion assay of the over-coating.

(Cissing-preventing Assay)

The cissing-preventing assay was performed to evaluate as similar as the assay mentioned above except for the procedure in Example 9 using the tin plate as the base plate instead of the procedure using the glass plate as the base plate by the applicator of the coater for 100 microns.

(Leveling Assay)

The leveling assay was performed to evaluate as similar as the assay mentioned above except for the procedure in Example 9 using the tin plate as the base plate instead of the procedure using the glass plate as the base plate by the applicator of the coater for 100 microns.

(Adhesion Assay of the Over-coating)

The coating agents of polyester melamine for baking of Examples 10-12, 15, and Comparative Examples 9-12 were respectively applied onto a cation electrodeposition coating plate and cured to prepare coating layers as similar as the procedure mentioned in Example 9. Other coating agents of polyester melamine for baking were respectively prepared by consisting of 44 parts by weight of polyester: ALMATEX P646, 11 parts by weight of U-VAN 20SE60, 28 parts by weight of titanium oxide: CR-95, 17 parts by weight of thinner which is blended of SOLVESSO 100 and methyl isobutyl ketone with ratio of 9:1 by volume, without addition of a surface conditioner. The coating agents of polyester melamine for baking were respectively applied onto the above-mentioned coating layers, and then they were cured by the procedures as similar as Example 9 to prepare over-coating layers. The assay and criteria of the evaluations are as same as mentioned above.

The results were summarized in Table 5. As shown in Table 5, it is obvious that the coating agents and the surface of the coating layer thereby obtained in Examples 9-12, 15 had all excellent properties of each assays, although it is obvious that the coating agents obtained in Comparative Examples 9-12 had at least one of insufficient properties of them than ones of the coating agents obtained in Examples 9-12, 15.

TABLE 5

| | Surface Conditioner | Cissing-Preventing Property | Leveling Property | Adhesion of Over-coating |
|---|---|---|---|---|
| Example 9 | Preparation Example 1 | Sufficient | Sufficient | 100 |
| Example 10 | Preparation Example 2 | Sufficient | Sufficient | 100 |
| Example 11 | Preparation Example 3 | Sufficient | Sufficient | 100 |
| Example 12 | Preparation Example 4 | Sufficient | Sufficient | 100 |
| Example 15 | Preparation Example 5 | Sufficient | Sufficient | 100 |
| Comparative Example 9 | Comparative Preparation Example 1 | Rather Poor | Rather Poor | 70 |
| Comparative Example 10 | Comparative Preparation Example 2 | Sufficient | Rather Poor | 100 |
| Comparative Example 11 | Comparative Preparation Example 4 | Rather Poor | Rather Poor | 30 |
| Comparative Example 12 | Comparative Preparation Example 5 | Rather Poor | Sufficient | 100 |

INDUSTRIAL APPLICABILITY

The surface conditioner for the coating agent of the present invention can be blended in the coating agent. The coating agent may be the paint for applying onto various base materials illustrated by the metal material such as the metal bodies of the automobiles and the initially provided metal materials for pre-coating, the plastics materials such as the housings for the home electric appliances, or the architectural materials such as the wall material and the shutter, or is the ink for applying onto other base materials being printed out such as paper. Also the surface conditioner for the coating agent may be used as the base material-wetting agent, the cissing-preventing agent or the leveling agent for blending in the coating agent. The coating agent of the present invention is used for protection or sensuousness of thus base materials by applying or printing thereof onto the base materials in order to form the coating layer on the surface of base materials.

What is claimed is:

1. A surface conditioner for a coating agent comprising:
   a copolymer comprising
      an acrylate monomer (A) having a siloxy group,
      an N-vinyllactam monomer (B), and
      an alkyl(meth)acrylate monomer (C) of which an alkyl group has 1 to 12 carbon atoms;
   wherein
      a ratio by weight of the monomer (A): the monomer (B): the monomer (C): is 1-40: 2-80: 10-97,
      weight average molecular weight of the copolymer is 1000 to 120000, and
      the copolymer has a rising temperature ranging from 280 to 400°, and the rising temperature is obtained by thermo-gravimetric analysis and identified by the temperature when a weight of a sample of the copolymer is reduced during heat up beyond 10% through decomposition or sublimation thereof.

2. The surface conditioner for the coating agent according to claim 1, wherein the acrylate monomer (A) having the siloxy group is at least one member selected from the group consisting of:
   at most 40 parts by weight of a mono(meth)acrylate with (meth)acrylic modification at one terminal, which is represented by the following chemical formula (I)

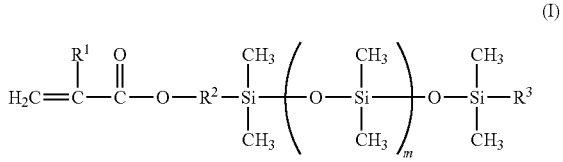

(I)

in the chemical formula (I), $R^1$ is a hydrogen atom or a methyl group, $R^2$ is an alkylene group having 1 to 10 carbon atoms, $R^3$ is an alkyl group having 1 to 12 carbon atoms, and m is a positive number of 2 to 150, at most 40 parts by weight of a mono(meth)acrylate with (meth)acrylic modification at one terminal, which is represented by the following chemical formula (II)

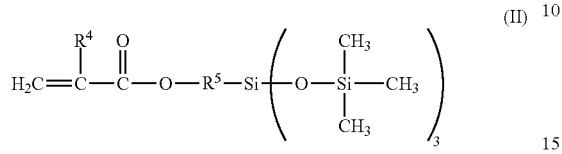

(II)

in the chemical formula (II), $R^4$ is a hydrogen atom or a methyl group, $R^5$ is an alkylene group having 1 to 10 carbon atoms, and 1 to 10 parts by weight of a di(meth)acrylate with (meth)acrylic modification at both terminals, which is represented by the following chemical formula (III)

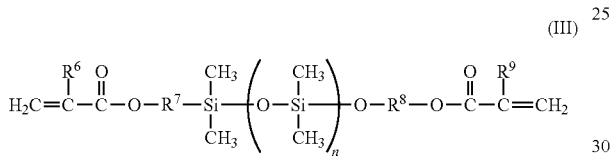

(III)

in the chemical formula (III), $R^6$ and $R^9$ is a hydrogen atom or a methyl group, $R^7$ and $R^8$ are an alkylene group having 1 to 10 carbon atoms, n is a positive number of 2 to 150;

and the N-vinyllactam monomer (B) is N-vinyl-2-pyrolidone and/or N-vinyl-ε-caprolactam.

3. A surface conditioner for a coating agent comprising an acrylate monomer (A) having a siloxy group,
an N-vinyllactam monomer (B),
an alkyl (meth)acrylate monomer (C) of which an alkyl group has 1 to 12 carbon atoms, and
a (meth)acrylate monomer (D) with lactone-modification; wherein
a ratio by weight of the monomer (A) : the monomer (B) : the monomer (C) is 1-40: 2-80: 10-97,
weight average molecular weight of the copolymer is 1000 to 120000,
a ratio by weight of the monomers (A) to (C) and the monomer (D) is 100:1 to 100:90,
and the monomer (D) is a reaction product of
an acrylic monomer containing a hydroxyl group and a lactone compound represented by β-propiolactone,
dimethylpropiolactone, butyllactone, γ-valerolactone, γ-caprylolactone, γ-laurylolactone, ε-caprolactone or δ-caprolactone.

4. A base material-wetting agent comprising;
the surface conditioner for the coating agent according to claim 1.

5. A leveling agent comprising;
the surface conditioner for the coating agent according to claim 1.

6. A coating agent comprising;
the surface conditioner for the coating agent according to claim 1, and coating ingredients.

7. A coating layer comprising;
the coating agent according to claim 6, wherein the coating agent is applied and then dried or cured.

8. The surface conditioner for the coating agent according to claim 3, wherein the acrylate monomer (A) having the siloxy group is at least one member selected from the group consisting of:

at most 40 parts by weight of a mono(meth)acrylate with (meth)acrylic modification at one terminal, which is represented by the following chemical formula (I)

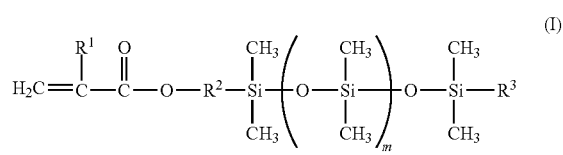

(I)

in the chemical formula (I), $R^1$ is a hydrogen atom or a methyl group, $R^2$ is an alkylene group having 1 to 10 carbon atoms, $R^3$ is an alkyl group having 1 to 12 carbon atoms, and m is a positive number of 2 to 150, at most 40 parts by weight of a mono(meth)acrylate with (meth)acrylic modification at one terminal, which is represented by the following chemical formula (II)

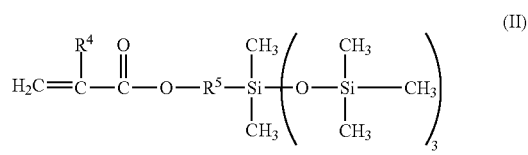

(II)

in the chemical formula (II), $R^4$ is a hydrogen atom or a methyl group, $R^5$ is an alkylene group having 1 to 10 carbon atoms, and 1 to 10 parts by weight of a di(meth)acrylate with (meth)acrylic modification at both terminals, which is represented by the following chemical formula (III)

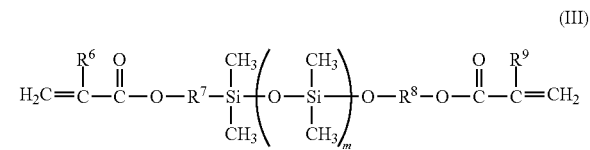

(III)

in the chemical formula (III), $R^6$ and $R^9$ is a hydrogen atom or a methyl group, $R^7$ and $R^8$ are an alkylene group having 1 to 10 carbon atoms, n is a positive number of 2 to 150;
and the N-vinyllactam monomer (B) is N-vinyl-2-pyrolidone and/or N-vinyl-ε-caprolactam.

9. A base material-wetting agent comprising:
the surface conditioner for the coating agent according to claim 3.

10. A leveling agent comprising:
the surface conditioner for the coating agent according to claim 3.

11. A coating agent comprising:
the surface conditioner for the coating agent according to claim 3, and coating ingredients.

12. A coating layer comprising:
the coating agent according to claim 11, wherein the coating agent is applied and then dried or cured.

* * * * *